INVENTOR:
THELMER A. ROGERS
BY:

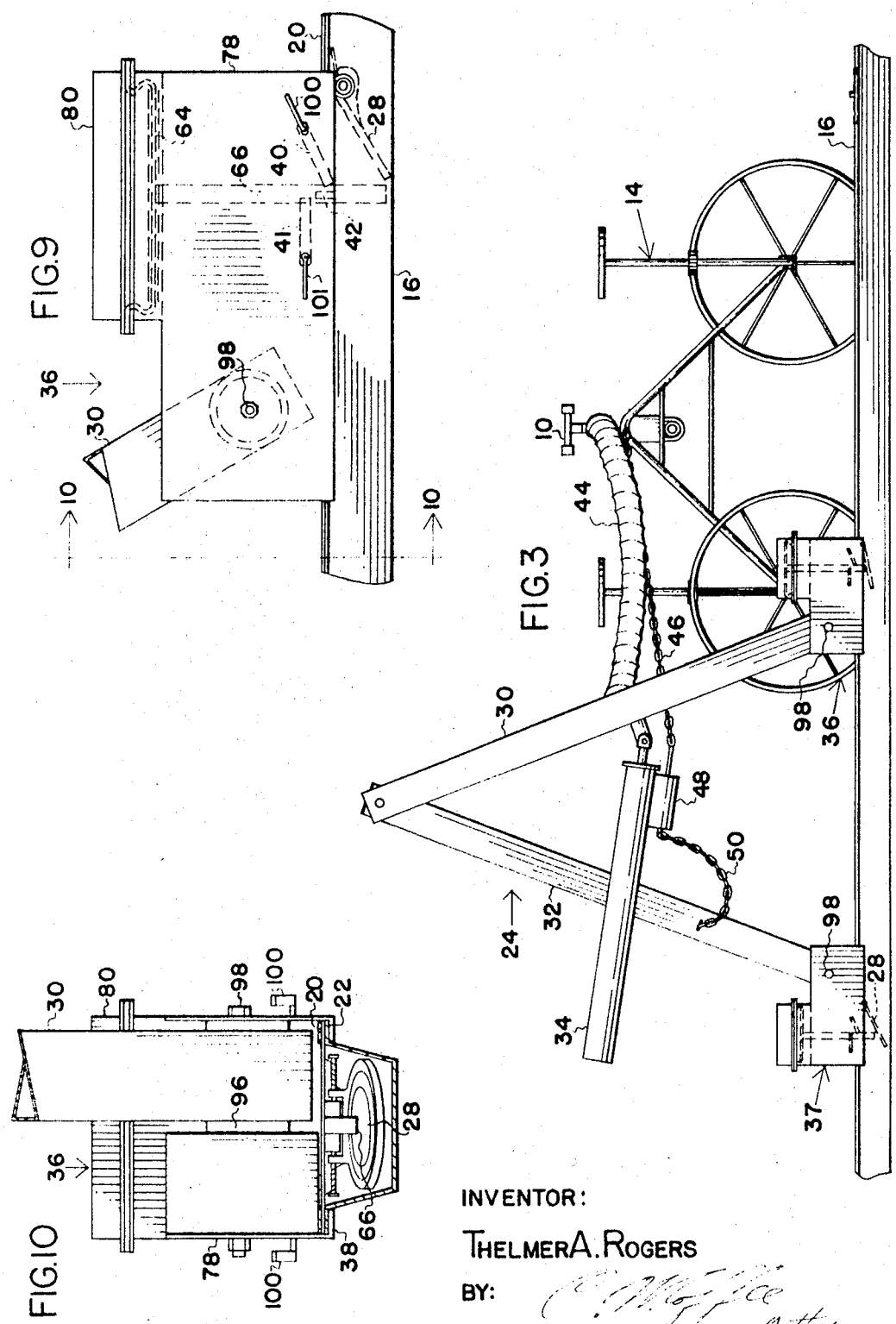

Aug. 26, 1969     T. A. ROGERS     3,463,175
CONSTANT MOVE AUTOMATIC IRRIGATOR
Filed Dec. 19, 1966     5 Sheets-Sheet 4
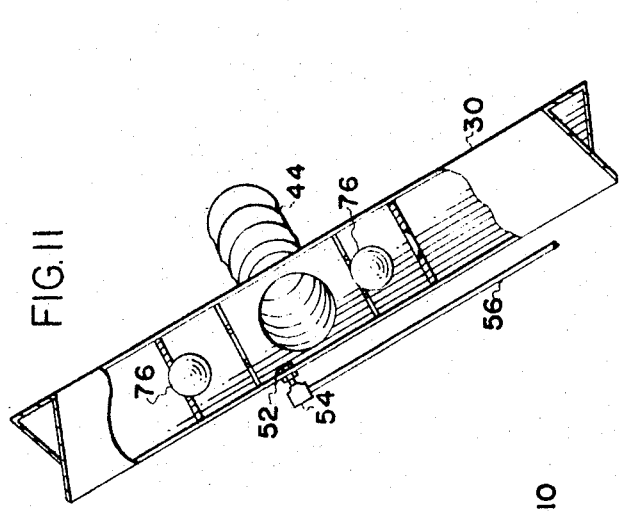
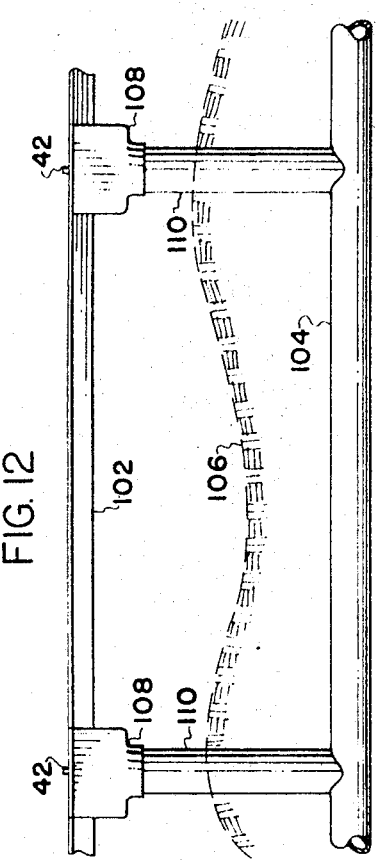
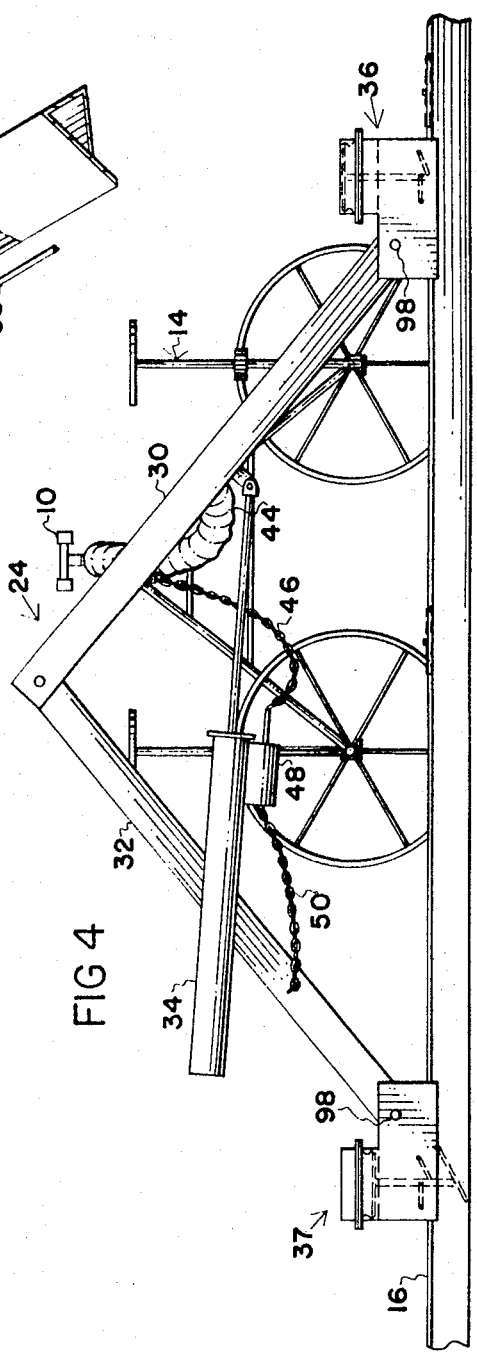
INVENTOR:
THELMER A. ROGERS
BY:

Aug. 26, 1969  T. A. ROGERS  3,463,175
CONSTANT MOVE AUTOMATIC IRRIGATOR

Filed Dec. 19, 1966  5 Sheets-Sheet 5

INVENTOR:
THELMER A. ROGERS
BY:

United States Patent Office 3,463,175
Patented Aug. 26, 1969

3,463,175
CONSTANT MOVE AUTOMATIC IRRIGATOR
Thelmer A. Rogers, P.O. Box 1589,
Lubbock, Tex. 79408
Filed Dec. 19, 1966, Ser. No. 602,961
Int. Cl. A01g 25/02; B60p 3/00; B05b 3/18
U.S. Cl. 137—1
10 Claims

ABSTRACT OF THE DISCLOSURE

A constantly moving irrigation sprinkler pipe is sequentially connected to a series of valves in a stationary supply conduit to transfer water under pressure to the sprinkler pipe. A step-terminal on the moving pipe moves two valve openers to the conduit valves by alternately expanding and contracting tubular legs. The valve openers are on the tubular legs and one of the valve openers is always anchored to one of the conduit valves. The valve opener opens the valve before sealing itself to the valve, thus flushing the sealing surface with a gush of water.

---

This invention relates to agricultural irrigation and, more specifically, to transferring water from a fixed conduit to a moving sprinkler pipe.

In agricultural irrigation today, it is often found desirable to have an automatic sprinkler system wherein a moving sprinkler pipe moves constantly while it is dispersing water therefrom and while being constantly supplied with water. It will be apparent that on short distances there are no particular problems involved inasmuch as a flexible hose can be extended from the water supply to the moving pipe; however, if the system is to move for extended lengths (e.g., 2,640 feet), more difficulty is encountered.

I have solved the problem by providing a conduit along one edge of the field to be watered with a plurality of valves in the conduit. On this conduit, I have provided a step-terminal which will sequentially attach itself to the valves in the conduit and continuously provide water to the moving pipe, even when elements of the step-terminal are moving from one valve to the next. The step-terminal has valve openers and means for expanding and contracting the distance between the valve openers. Therefore, the first or forward valve opener is moved forward to a valve, seats itself thereon, and opens the valve to furnish water into the step-terminal. Thereafter, the distance between the two valve openers is contracted and the second or aft valve opener attaches itself to a valve and opens the valve, providing water to the step-terminal. Thereafter, of course, the forward valve opener is ready and available to be expanded forward to the next valve.

An object of this invention is to transfer water from a stationary conduit to a moving pipe.

Another object is to accomplish the above constantly.

Further objects are to achieve the above with a device that is sturdy, compact, durable, simple, safe, versatile, reversible, and reliable, yet inexpensive and easy to manufacture, install, operate, and maintain.

Still further objects are to achieve the above with a method that is rapid and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale, in which.

Figure 2:
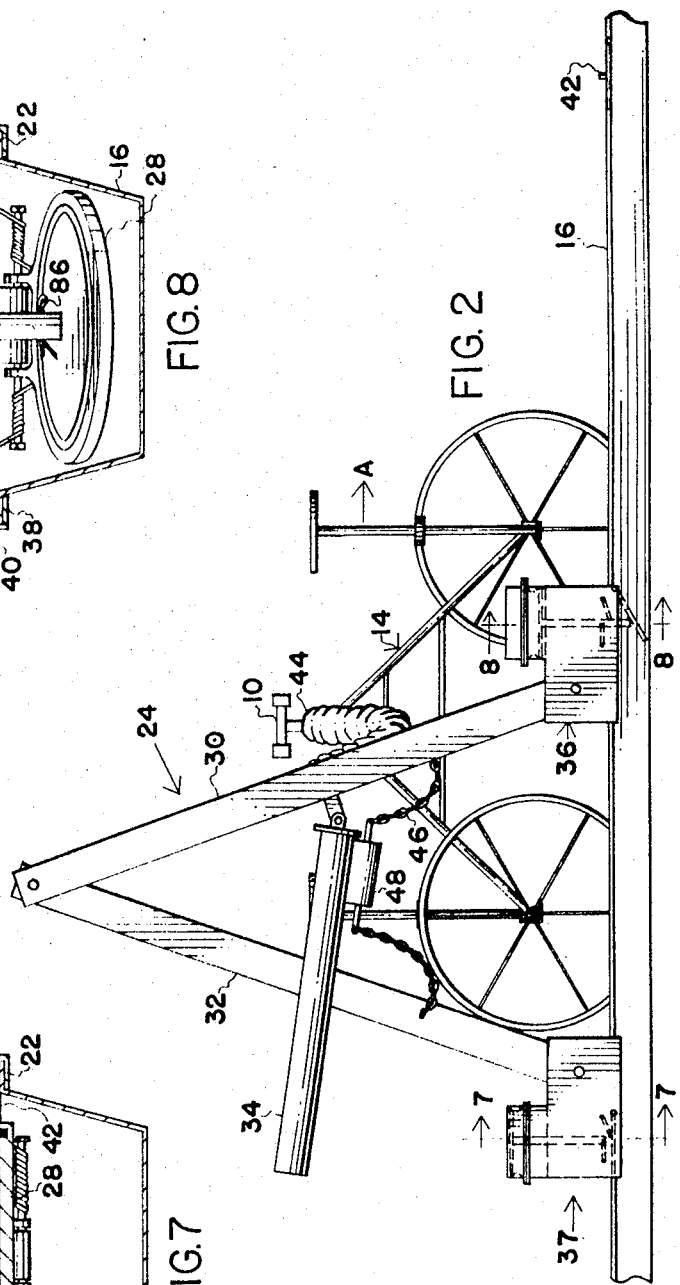
FIG. 2 is an elevational view of the invention, with elements omitted for clarity.
Figure 5:
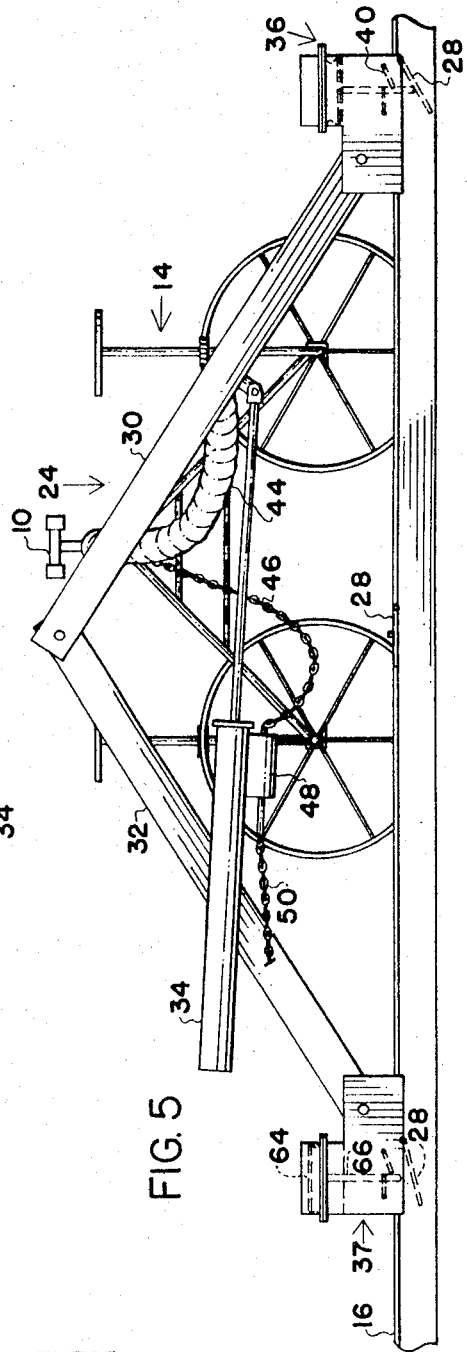

FIGS. 3, 4, and 5 are the same as FIG. 2 but in different positions.

Figure 6:
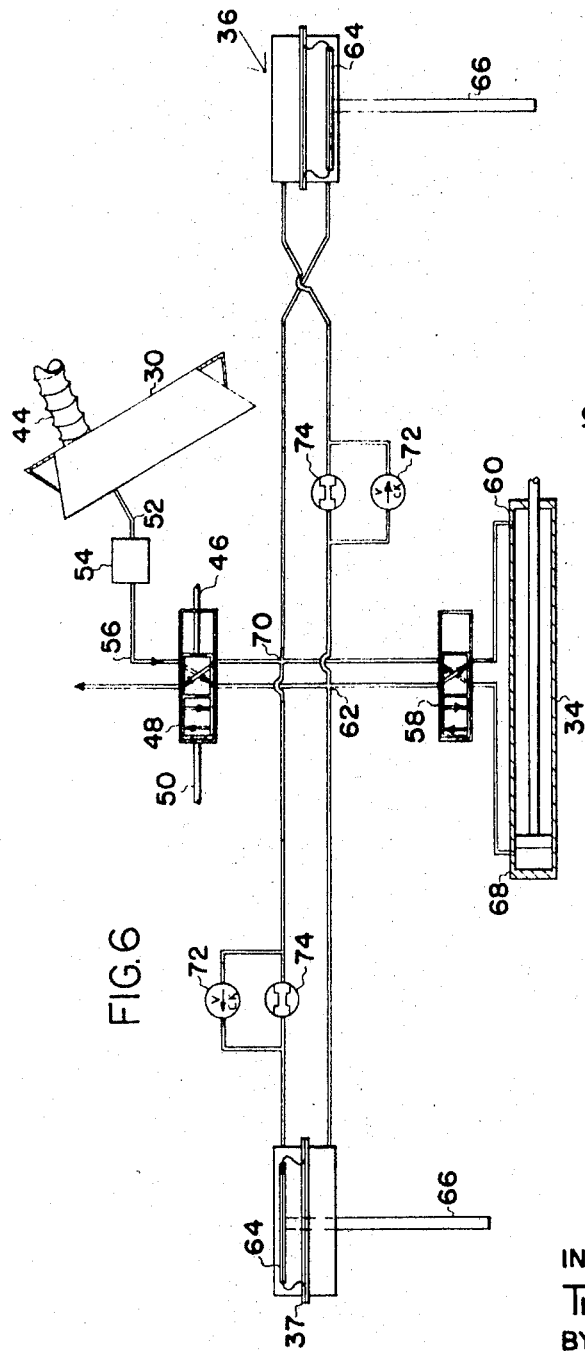

FIG. 6 is a schematic representation of the control system.

Figure 7:
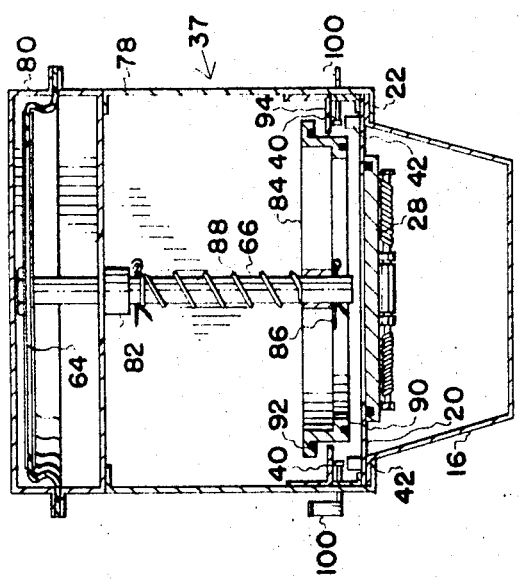

FIG. 7 is a sectional view taken substantially on line 7—7 of FIG. 2, showing the valve in the closed position.

Figure 8:
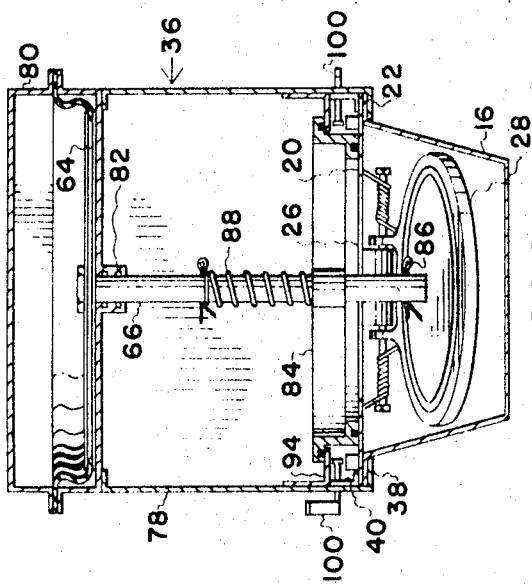

FIG. 8 is a sectional view taken substantially on line 8—8 of FIG. 2, showing the valve in the open position.

FIG. 9 is an enlarged side elevational view of the forward valve opener.

FIG. 10 is an end view of the valve and valve opener taken substantially on line 10—10 of FIG. 9.

FIG. 11 is a partial view broken away in parts, showing a portion of the step-terminal.

FIG. 12 is a side elevational view of a second embodiment of the stationary conduit and rails.

The purpose of the system is to discharge water through sprinklers 10 upon the land to be irrigated. The sprinklers are mounted upon moving sprinkler pipe 12 which is movingly supported by vehicles 14. Inasmuch as vehicles which movingly support a sprinkler pipe of water at all times are well known to the art, they will not be further described here. They have been shown in the drawing to be of a general type vehicle shown in the U.S. patents to Purtell, 3,245,595 and 3,245,608; however, other type vehicles could be used, e.g., those shown in Rudell, 2,931,579. The vehicles 14 are somewhat schematically represented in the drawing inasmuch as they do not show the belts connected to the pulleys, etc.

Figure 1:
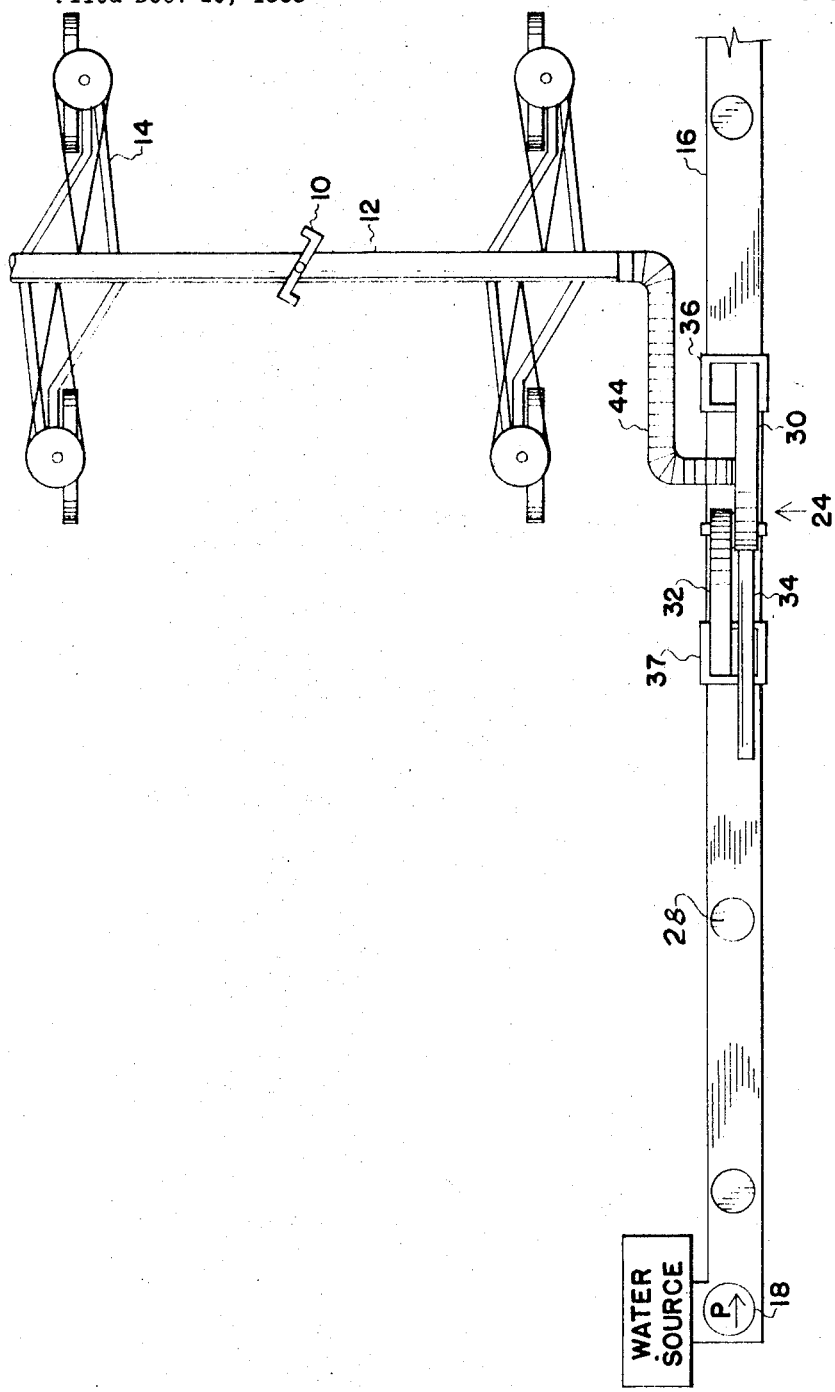
FIG. 1 is a plan view somewhat schematic of the invention.

Water under pressure is supplied to the moving pipe 12 from stationary conduit 16 which itself is supplied with water under pressure by suitable pump 18 (FIG. 1). The stationary conduit 16 has a flat top 20 with horizontal flanges 22 extending on either side, thus forming a convenient rail along which step-terminal 24 moves (FIG. 10). The top 20 of the conduit 16 has a plurality of openings or ports 26 therein. These ports are normally closed by flap valve discs 28.

The step-terminal 24 itself is basically composed of two tube legs, forward tube leg 30 and aft tube leg 32 (FIGS. 2, 3, 4, and 5). It will be understood that the vehicle could be reversed to run in the opposite direction. The forward and aft tube legs are generally upstanding so that, together with motor cylinder 34, they form an A. The tube legs 30 and 32 are pivoted together at the top with a fluid connection so that there is fluid communication from one to the other and still they are free to expand or contract their feet. Elements or valve openers 36 and 37 are upon the feet of each. Forward opener 36 is upon the bottom of forward leg 30 and after opener 37 is on the bottom of aft leg 32. The valve openers are pivoted to the tube legs 30 and 32 so as not to bind the movement of the forward and aft tube legs. Each of the valve openers 36 and 37 has a lower portion which is of correlative shape to the flanges 22 and includes a lower lip 38 which extends under the flanges 22, thereby forming a sliding connection between the valve opener 36 or 37 and the conduit 16 (FIGS. 7, 8, and 10). Likewise, the valve openers 36 and 37 have a spring latch 40 which cooperates with bar 42 upon the conduit 16 at each port 26 as will be explained later.

Explaining broadly the operation of the equipment, FIG. 2 shows the equipment in place with the tube legs 30 and 32 fully contracted by the action of the motor cylinder 34. The forward valve opener 36 is shown over the open valve 28 with water being supplied through the valve opener 36 into the forward tube leg 30 and thence from forward tube leg 30 to flexible hose 44 into the moving pipe 12. The moving pipe 12, together with the vehicles 14, is moving forward slowly in the direction of arrow A.

The situation continues until the position is reached as depicted in FIG. 3, at which time the moving pipe 12 and vehicles 14 have reached a point when the vehicles are in advance of the step-terminal 24. At that time, the control chain 46 becomes taut and moves control valve 48 into another position. This new position causes the motor cylinder 34 to expand, which begins to separate the tube legs 30 and 32 and thus the openers 36 and 37. The pressure upon the forward opener 36 anchors it and it will not move forward, but the aft tube leg 32 will move to the rear until spring latch 40 engages bar 42, at which time it is blocked or anchored from further rearward movement. The valve 28 which is under the aft valve opener 37 will be opened, thus supplying water through the aft tube leg 32 into forward leg 30 and through hose 44 into the moving pipe 12. Simultaneously, the valve 28 beneath the forward valve opener 36 will be closed.

When the valve 28 under the forward valve opener 36 is closed, the pressure is relieved therefrom and the stress still being exerted by the motor cylinder 34 will cause the tube legs 30 and 32 and thus the openers 36 and 37 to further expand as seen in FIG. 4. The tube legs 30 and 32 continue to expand by action of the motor cylinder 34 until expanding control chain 50 becomes taut, as seen in FIG. 5, again reversing control valve 48. The forward valve opener 36 will be in a position past or forward of the next valve 28 (this position not shown). The spring latch 40 will flip upward to pass over the bar 42 upon forward movement.

When the control valve 48 is again reversed, it causes motor cylinder 34 to begin contracting the tube legs 30 and 32 and openers 36 and 37. Then the first result is that the forward valve opener 36 will move rearward until stopped by the spring latch 40 engaging the bar 42 and the subsequent opening of the valve 28 beneath the forward valve opener 36. Also, the valve opener 37 will be closed, releasing the pressure upon the aft valve opener and permitting it to move forward under the continuing pressure exerted by the motor cylinder 34. This forward movement of the aft tube leg 32 will return the system to the position shown in FIG. 2. The entire cycle as described above is then repeated.

Describing more completely the controls as illustrated in FIG. 6, the water to power the sequences of operation is provided by tap 52 into the forward tube leg 30 (also shown in FIG. 11). Sand trap 54 is adjacent the tap to strain out impurities. Fluid connection 56 extends to control valve 48. The controls are shown as they would be seen in the position of FIG. 2, i.e., the valve 48 is in the position in which it would remain after the expanding control chain 50 had moved the valve 48 into the position shown. A fluid connection then exists through the valve 48 into reversing valve 58 and through the reversing valve 58 into contracting side 60 of the motor cylinder 34. Also, in this position, fluid pressure is provided through cross 62 to the top of diaphragm 64 in the forward valve opener 36. This causes valve plunger 66 to depress flap valve 28, thereby opening it. (See FIG. 9.) Likewise, pressure is provided through cross 62 to the under side of diaphragm 64 in aft valve opener 37 so that the plunger 66 thereof is up and the flap valve 28 thereunder is in its closed position.

When the control valve 48 is reversed by the tension of control chain 46, as seen in FIG. 3, analysis of the control system reveals that pressure is supplied through control valve 48 to expanding side 68 of the motor cylinder 34. Likewise, pressure will be supplied through cross 70 to the top side of the diaphragm 64 of the aft valve opener 37, thus beginning the opening of the valve 28 thereunder. Furthermore, pressure is supplied to the underside of the diaphragm 64 in the forward valve opener 36 so that the valve flap 28 thereunder begins to close. Check valves 72 permit the valve openers 66 to move to the down or open position rapidly, but orifices 74 do not permit the plunger 66 to move to the up or closed position rapidly. Therefore, one flap valve 28 is not closed until the other flap valve is open.

After the plunger 66 of the forward valve opener 36 has slowly moved to the closed position and the pressure has been removed from the forward valve opener 36, the continuing expanding pressure upon motor cylinder 34 continues to expand the tube legs 30 and 32 (as seen in FIG. 4) until the position of full expansion is reached. (This position has not been shown.) When full expansion has been reached, the expansion control chain 50 will again move the control valve 48 into the position as seen in FIG. 6; however, at this time, the diaphragms 64 will be in the reverse position as seen. Also, the motor cylinder 34 will be in the reverse position as seen. The pressure upon the contracting side 60 will move the forward tube leg 30 back until the latch 40 engages the bar 42 and the plunger 66 of the forward valve opener 36 opens the flap valve 28. Also, as soon as the plunger 66 of the aft valve opener 37 is slowly raised and the valve 28 closed, the continued pressure on the contracting side 60 will bring the tube legs 30 and 32 back into the position as seen in FIG. 2, which is the starting position.

FIG. 11 shows two ball check valves 76 in the forward tube leg 30 on either side of the flexible hose 44 and tap 52. These valves 76 always permit the flow of water into the hose 44 and the tap 52, but prevent an opposite flow, thus preventing flow from the opener 36 or 37 when they are not sealed against one of the ports 26.

The valve openers 36 and 37 are basically identical (FIGS. 7, 8, 9, and 10). As previously mentioned, each has a lip 38 which cooperates with flange 22. Also, each has a water-tight housing 78. Diaphragm box 80 is attached to the housing 78 at the top thereof. The plunger 66, attached to the diaphragm 64, extends through seal 82 in the dividing wall between the housing 78 and the box 80. Sealing ring 84 is mounted by a spider to a hub for axial sliding movement upon the plunger 66. Cotter key 86 limits the downward movement of the hub and thus the sealing ring 84. The sealing ring is biased downward by compression spring 88 which encircles the plunger 66. As the plunger 66 moves downward, it first opens the valve 28 before the stress of spring 88 seals the ring 84 in place. Therefore, the initial flow of water will flow over the ring seating surfaces to flush them clean. Continued downward movement of the plunger 66 increases the compression upon the spring 88 to force the sealing ring 84 into sealing position. The sealing ring has lower sealing surface 90 which seals to the flat top 20 of the conduit 16. Also, the sealing ring 84 has upper sealing surface 92 which seals against internal flange 94. The upper seal 92 is of greater diameter than the lower seal 90 and, therefore, water pressure within the housing 78 will hold the seal in place as well as the spring 88. The tube legs are pivoted to the housing 78 by rotary joint 96. Inasmuch as rotary joints are well known to the art, they will not be further discussed here, except to note that bolt 98 extends through the joint at its axis to prevent water pressure from forcing the joint apart.

The latches 40 are pivoted through the sides of the housing 78. The stop bars 42 are securely fastened to the top 20 of the conduit 16 adjacent the flanges 22. External handles 100 provide means for inactivating the latches 40. Duplicate latches 41 and handles 101 are provided for reversing. Analysis will show that, if the reversing valve 58 is reversed and the latches 41 are activated by moving handles 101 and latches 40 inactivated by handles 100, the step-terminal will move in the opposite direction. When moving in the opposite direction, it is necessary to reverse the chains 46 and 50 for proper control.

An obvious variation is that the track, formed by the flanges 22, could be in the form of angle irons 102 (FIG. 12). Therefore, as an alternate form, stationary conduit 104 could be buried beneath the surface of the earth 106 and valves 108 mounted above the surface of the earth on the top of risers 110.

I claim as my invention:

1. In an agricultural irrigation system having
   (a) a stationary conduit,
   (b) a plurality of valves in the conduit,
   (c) means for supplying water under pressure to the conduit,
   (d) a moving pipe,
   (e) vehicles movingly supporting said moving pipe, and
   (f) said moving pipe adapted to carry sprinklers thereon;
   (g) the improved means for transferring water under pressure from the stationary conduit to the moving pipe comprising:
   (h) rails along the conduit,
   (j) at least one valve opener
   (k) mounted for movement along the rails,
   (m) a flexible hose from the valve opener to the moving pipe,
   (n) means for opening the valve and for sealing the valve to the flexible hose on the valve opener, and
   (o) means attached to the valve opener for moving the opener along the rails.

2. The invention as defined in claim 1 with the additional limitations of:
   (p) a second element
   (q) mounted for movement along the rails,
   (r) said means for moving the valve opener also being means for moving the second element, and
   (s) said means for moving interconnecting the valve openers and the second element.

3. The invention as defined in claim 1 with the additional limitations of:
   (p) a second valve opener
   (q) mounted for movement along the rails,
   (r) the two valve openers fluidly connected, and
   (s) means for opening the valve and for sealing the valve to the flexible hose on the second valve opener,
   (t) said means for moving the first named opener also being means for moving the second valve opener, and
   (u) said means for moving interconnecting the valve openers.

4. The invention as defined in claim 1 with the additional limitations of:
   (p) said valve opener including a plunger,
   (q) said plunger operatively contacting the valve when the valve is open,
   (r) a diaphragm attached to the plunger, and
   (s) means for connecting water under pressure from the valve opener to the diaphragm, thus operating the valve by the water pressure.

5. The invention as defined in claim 4 with the additional limitations of:
   (t) a sealing ring surrounding the plunger, and
   (u) a spring interconnecting the plunger and sealing ring so that the plunger opens the valve before the sealing ring seals the connection, thus the gush of water flushes the sealing surfaces.

6. In an agricultural irrigation system having
   (a) a stationary conduit,
   (b) a plurality of valves in the conduit,
   (c) means for supplying water under pressure to the conduit,
   (d) a moving pipe,
   (e) vehicles movingly supporting said moving pipe, and
   (f) said moving pipe adapted to carry sprinklers thereon;
   (g) the improved valve openers for opening the valves in the stationary conduit comprising in combination with the above:
   (h) a housing fluidly connected to the moving pipe,
   (j) a plunger in the housing,
   (k) means interconnecting the housing and conduit for positioning the plunger over each of the valves sequentially,
   (m) a ring seal means surrounding the plunger for sealing the conduit around the valve to the housing,
   (n) a spring interconnecting the plunger and ring seal means so that the plunger opens the valve before the seal means seals, thus permitting a gush of water to flush the seal surfaces.

7. The method of transferring fluids under pressure from a stationary conduit to a moving pipe comprising the steps of:
   (a) guiding a pair of elements along the stationary conduit,
   (b) opening valves in the conduit with at least one element,
   (c) expanding and contracting the spacing between the elements,
   (d) sliding the elements individually in a forward direction,
   (e) blocking the elements individually from moving appreciably in a backward direction, and
   (f) transferring water under pressure from the element which opens a valve to the moving pipe.

8. The invention as defined in claim 7 with the additional limitation of
   (g) triggering an expansion-contraction cycle responsive to the position of the moving pipe to the pair of elements.

9. The method of transferring fluids under pressure from a stationary conduit to a moving pipe comprising the steps of:
   (a) guiding at least one valve opener along the stationary conduit,
   (b) opening valves in the conduit with the valve opener,
   (c) forcing the valve opener sequentially to adjacent valve by:
      (i) anchoring the valve opener, then
      (ii) forcing an element along the stationary conduit by reaction on the anchored valve opener, then
      (iii) releasing the valve opener and
      (iv) anchoring the element, then
      (v) forcing the valve opener along the stationary conduit by reaction on the anchored element, and
   (d) transferring water under pressure from the valve opener to the moving pipe.

10. The invention as defined in claim 9 with the additional limitation of:
    (e) forcing the valve opener to the adjacent valve responsive to the position of the moving pipe to the valve opener.

References Cited

UNITED STATES PATENTS

| | | | |
|---|---|---|---|
| 887,911 | 5/1908 | Bevill | 239—184 |
| 1,038,231 | 9/1912 | Taylor et al. | 137—238 |
| 1,935,295 | 11/1933 | Kauffman | 239—186 |
| 2,750,228 | 6/1956 | Engel | 239—184 |
| 3,155,370 | 11/1964 | Drumm et al. | 137—614.06 XR |
| 3,202,172 | 8/1965 | Bergeron et al. | 137—344 |
| 3,349,794 | 10/1967 | Behlen | 239—183 XR |

SAMUEL SCOTT, Primary Examiner

U.S. Cl. X.R.

137—344; 239—184